United States Patent [19]

Caputo

[11] Patent Number: 4,600,865
[45] Date of Patent: Jul. 15, 1986

[54] TRANSPORTATION APPARATUS

[75] Inventor: William R. Caputo, Wyckoff, N.J.

[73] Assignee: Westinghouse Electric Corp., Pittsburgh, Pa.

[21] Appl. No.: 666,065

[22] Filed: Oct. 29, 1984

[51] Int. Cl.$^4$ .............................................. H02P 3/04
[52] U.S. Cl. ..................................... 318/274; 318/63; 318/86; 198/321
[58] Field of Search ............... 318/269, 270, 271, 273, 318/274, 53, 59, 60, 61, 63, 64, 86, 90; 198/321, 330

[56] References Cited

U.S. PATENT DOCUMENTS

| | | | |
|---|---|---|---|
| 3,707,220 | 12/1972 | Boltrek et al. | 198/330 |
| 3,860,860 | 1/1975 | Moran et al. | 318/269 X |
| 4,056,759 | 11/1977 | Mitsui et al. | 198/330 |
| 4,139,810 | 2/1979 | Ueki et al. | 198/330 X |
| 4,276,500 | 6/1981 | Sumka et al. | 318/366 X |
| 4,493,398 | 1/1985 | Kindler | 318/269 X |

OTHER PUBLICATIONS

Western Electric Technical Digest, "Clutch-Brake Speed Control", No. 41, pp. 7-8, Jan. 1976.

Primary Examiner—William M. Shoop, Jr.
Assistant Examiner—Bentsu Ro
Attorney, Agent, or Firm—D. R. Lackey

[57] ABSTRACT

Transportation apparatus, such as escalators and moving walks, having controlled stopping characteristics. Deceleration is directly regulated via a deceleration servo loop which provides a current reference signal for an inner current loop. Brake current limiting prior to the controlled stop, as well as mechanically limiting the maximum brake gap, results in faster transient response, and a more linear braking torque versus brake current characteristics. Multiple drive units operate from a common deceleration reference signal, while having independent servo loops each operating from a "local" deceleration signal.

13 Claims, 28 Drawing Figures

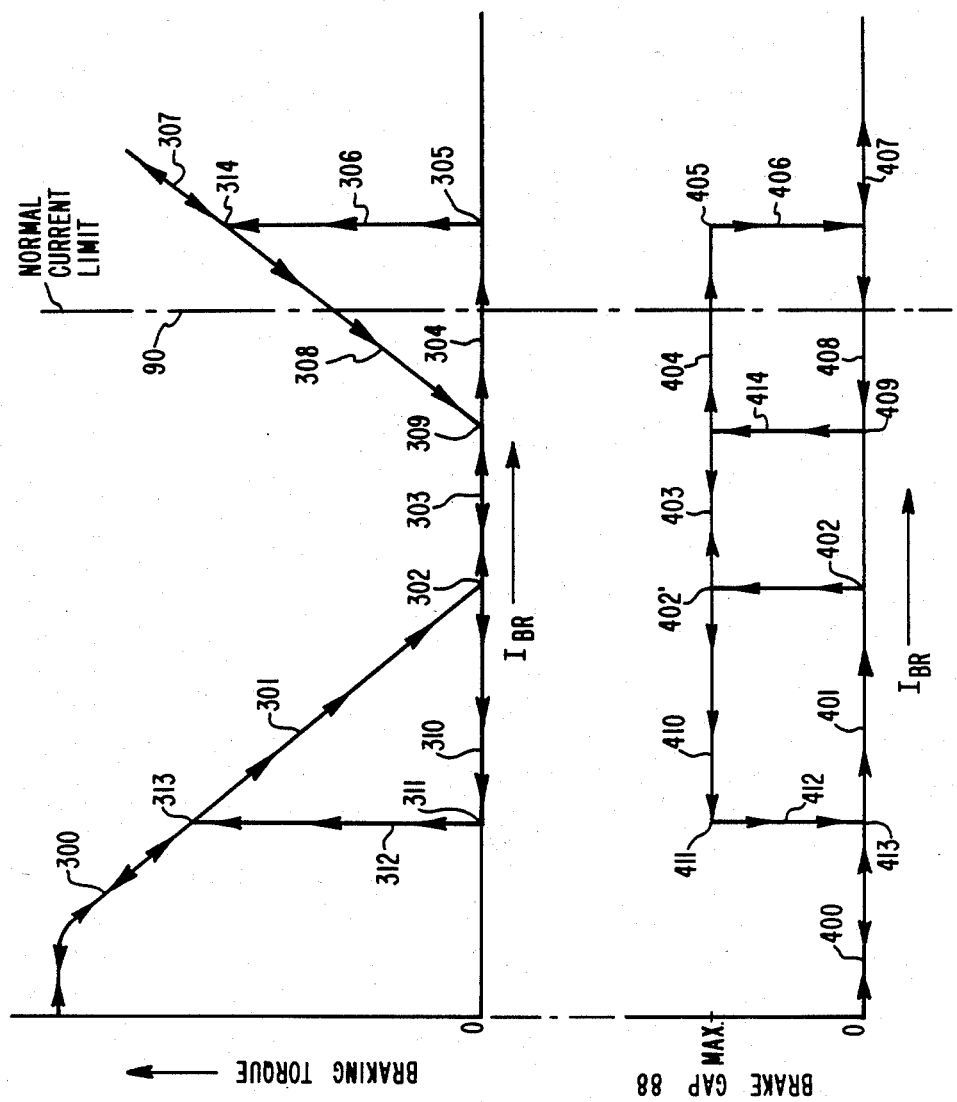

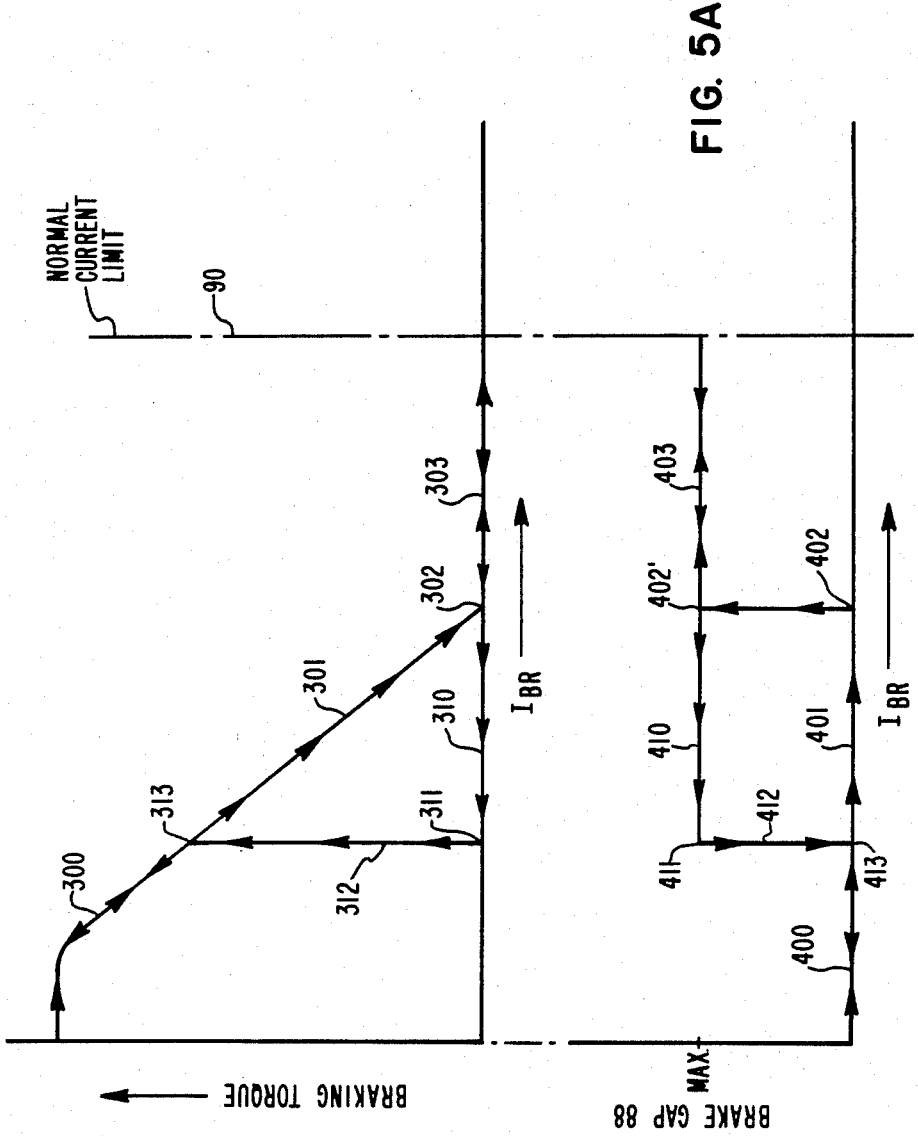

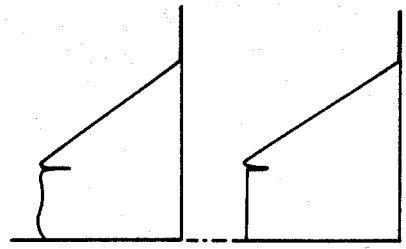
FIG. 18D 7,000 LBS.
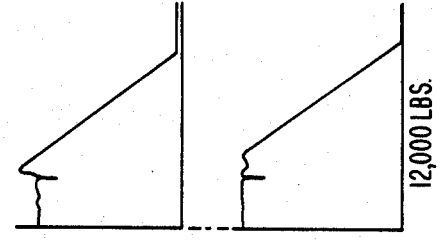
FIG. 18G 12,000 LBS.
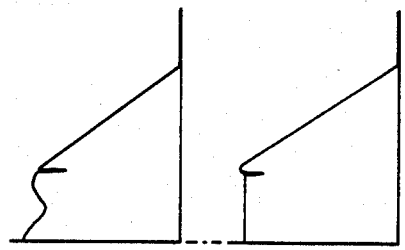
FIG. 18C 6,000 LBS.
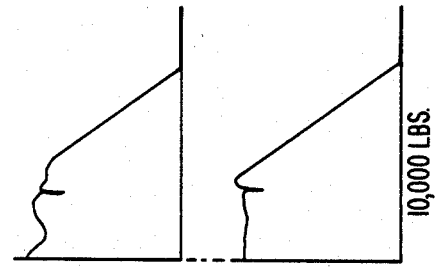
FIG. 18F 10,000 LBS.
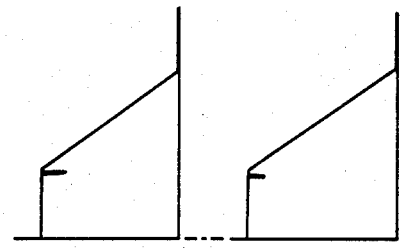
FIG. 18B 3,500 LBS.
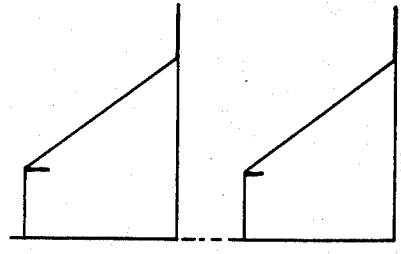
FIG. 18A NO LOAD
FIG. 18E 8,000 LBS.

TRANSPORTATION APPARATUS

BACKGROUND OF THE INVENTION

1. Field of the Invention

The invention relates in general to transportation apparatus, and more specifically to an escalator or a moving walk having means for controlling its deceleration rate during a stop.

2. Description of the Prior Art

Copending application Ser. No. 605,041, filed Apr. 30, 1984, discloses transportation apparatus, such as an escalator, which is feedback controlled to stop the apparatus according to a predetermined speed pattern. An AC component is added to a unidirectional signal responsive to actual speed, to modulate the brake current for smoother and more accurate control.

Copending application Ser. No. 644,754, filed Aug. 27, 1984, improves upon the transportation apparatus disclosed in application Ser. No. 605,041. The improvements relate to causing the speed pattern to track the actual speed of the apparatus, without exceeding it, so their values are relatively close to one another at the time deceleration is initiated. Also, the speed pattern ramp is delayed until the actual speed of the transportation apparatus drops to the starting value of the speed pattern. The arrangements of the copending applications, which are both assigned to the same assignee as the present application, perform well when applied to an escalator having a single drive unit. In an application of the teachings of the copending applications to an escalator having two drive units, one servo loop was used to drive the brakes of the two drives in parallel, with tachometer feedback coming from one of the drives. The results were not consistent, and the actual speed of the escalator varied significantly from the desired speed established by the slope of the slowdown portion of the speed pattern signal. U.S. Pat. No. 3,707,220 describes an escalator of the type which may have more than one drive unit, with the number of drive units being dictated by the rise of the escalator.

Thus, it would be desirable to provide a new and improved braking arrangement for controlling the slowdown of transportation apparatus, such as an escalator, after its drive unit, or drive units, are disconnected from the power source, with the new and improved braking arrangement being equally suitable for single or multi-drive escalators or moving walks.

SUMMARY OF THE INVENTION

Briefly, the present invention relates to a new and improved transportation apparatus, such as an escalator, which regulates deceleration directly. This provides a faster response than a velocity regulated design. It is also less complicated, as the deceleration pattern has a constant value, instead of a declining value, as in the velocity regulated servo. Regulating deceleration directly also eliminates the need for closely matching the actual escalator speed to a desired speed at the start of the deceleration, and it eliminates the high jerk which results when such a mismatch occurs.

The invention utilizes a deceleration servo loop, having an inner regulated current loop, with the deceleration servo loop providing a current reference for the current loop. Brake current limiting is utilized, with a different maximum value for running speed, i.e. when the brake is picked up, than for the deceleration phase, when the brake is controlled. Brake current limiting speeds brake response by minimizing the brake gap state change, and it permits the use of a higher brake supply voltage for increasing brake coil forcing and thus providing better brake transient response. Mechanical limiting of the brake gap is also utilized, for faster brake response and less hysteresis, than an unmodified brake. An unmodified brake is more likely to operate in a bistable mode, i.e., either lifted or set.

In one embodiment of the invention, the running brake current is not regulated, i.e., only the brake current during deceleration is regulated. In another embodiment, the running brake current is also included in the servo loop, which insures full release of the brake when in the running configuration. This aspect of the invention improves the performance of brakes which are particularly sensitive to brake temperature and supply voltage.

When the teachings of the invention are applied to an escalator having more than one drive unit, an independent servo loop is provided for each drive unit. Each servo loop includes its own local feedback signal which provides a measure of the actual deceleration rate of the apparatus at the location of the associated drive unit. A single deceleration reference is used to provide a single deceleration reference signal which is common to all of the drive units.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 5 is a graph which compares brake torque, and brake gap, versus brake coil current, of an unmodified commercially available brake;

FIG. 5A is a graph which is similar to FIG. 5, except modified to illustrate brake current limiting;

FIGS. 18A through 18G are strip chart waveforms of speed versus time at each drive unit of a two drive unit escalator from no-load to full-load;

DESCRIPTION OF PREFERRED EMBODIMENTS

Figure 1:
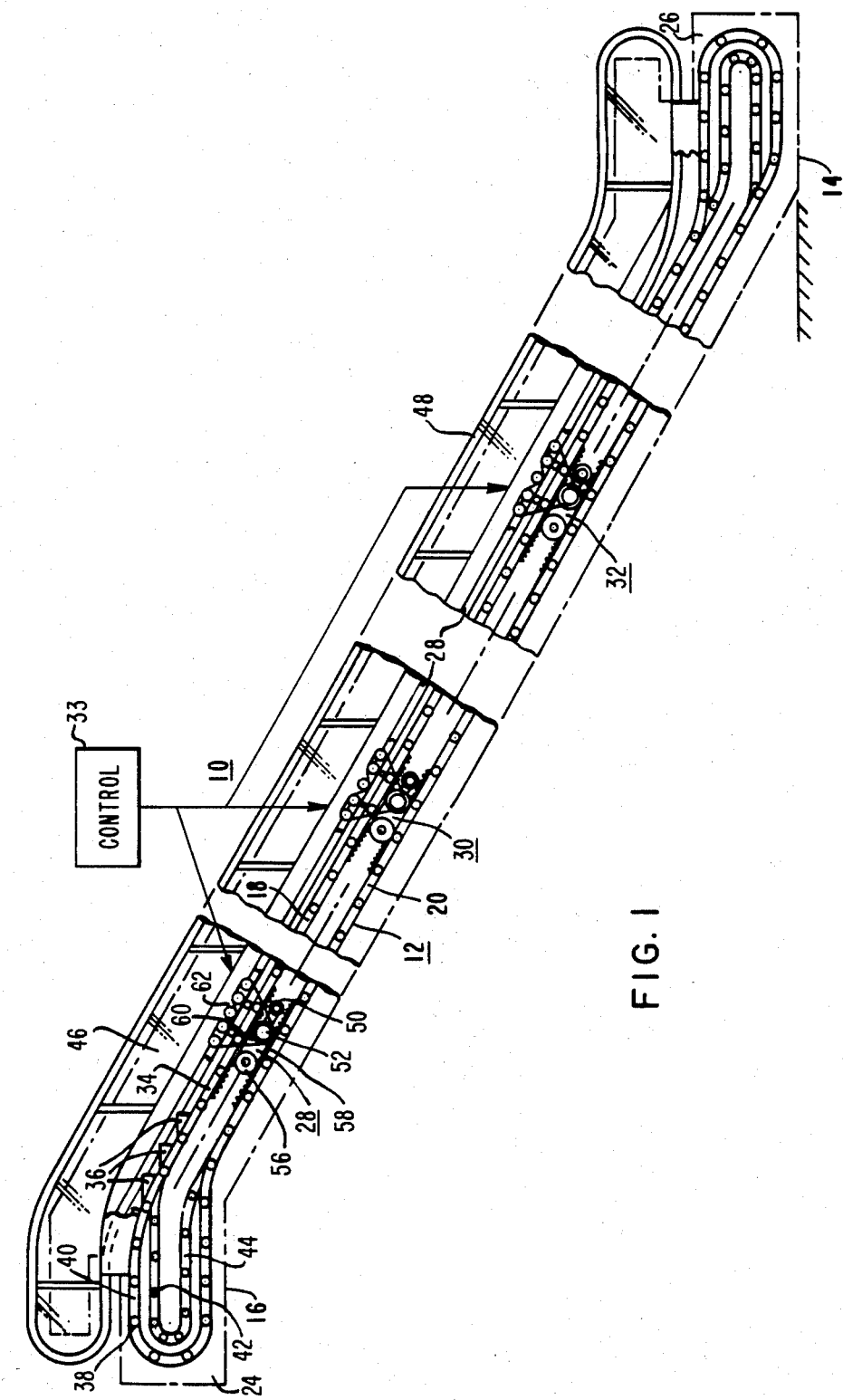
FIG. 1 is an elevational view of an escalator which may have brake control constructed according to the teachings of the invention.

Referring now to the drawings, and to FIG. 1 in particular, there is shown transportation apparatus 10 which may utilize the teachings of the invention. While the invention is equally applicable to moving walkways, for purposes of example it will be described relative to an escalator. Escalator 10 employs a conveyor portion 12 for transporting passengers between a first or lower landing 14 and a second or upper landing 16. Conveyor 12 is of the endless type, having an upper load bearing run 18 on which passengers stand while being transported between the landings, a lower run 20, and upper and lower turnarounds 24 and 26, respectively, which interconnect the load bearing and return runs. While the invention may be utilized with any type of moveable stairway, its use is particularly advantageous with the modular passenger conveyor construction disclosed in U.S. Pat. No. 3,707,220, which uses one or more spaced drive units, according to the length of the conveyor. Three drive units 28, 30 and 32 are illustrated in FIG. 1, but any practical number starting with 1 may be used. Drive units 28, 30 and 32 are controlled by electrical controller 33, such as set forth in U.S. Pat. No. 4,276,500, which is assigned to the same assignee as the present application.

Conveyor 12 is constructed of rigid, pivotally interconnected toothed step links 34, step axles (not shown) and steps 36. The rack constructed of the step links 34 and step axles is supported by guide wheels 38 which cooperate with guide tracks 40. Steps 36, in addition to being supported by the step axles, are also supported and guided by trailer wheels 42 which cooperate with trailer guide tracks 44. A ballustrade 46 is disposed above the conveyor 12, on each side thereof, for guiding a continuous flexible handrail 48.

As hereinbefore stated, conveyor 12, and thus the steps 36, are driven by one or more drive units. Each drive unit is similar in construction. Thus, only the uppermost drive unit 28 will be described in detail, with like reference numerals and prime marks being used to identify like components of the other drives.

Figure 2:
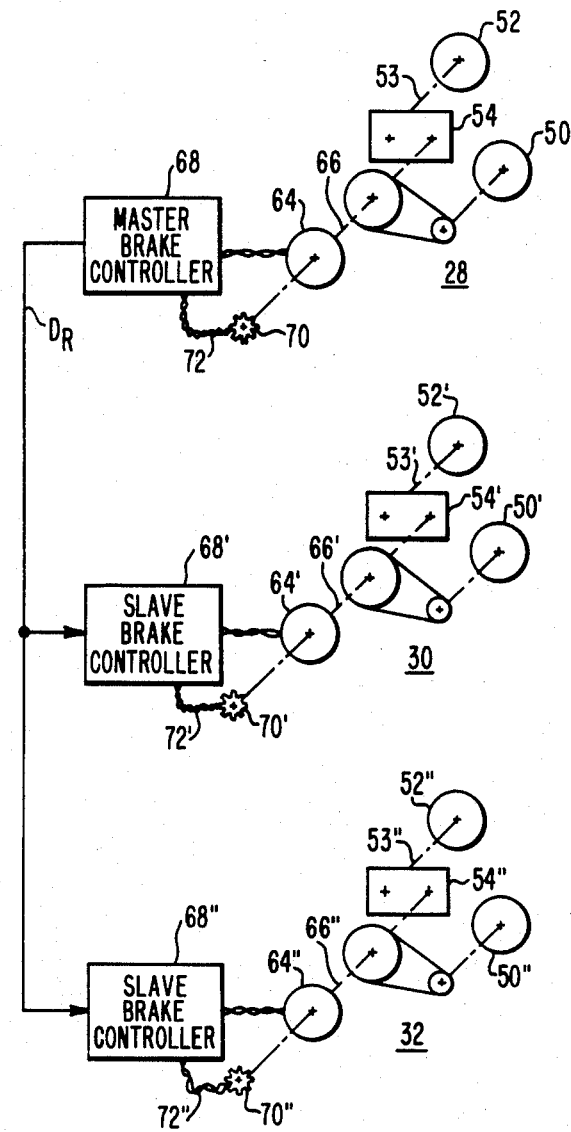
FIG. 2 schematically illustrates the multiple drive units of the escalator shown in FIG. 1.

FIG. 2, which is a schematic diagram of the three drive units 28, 30 and 32, will also be referred to in the following description.

Drive unit 28 includes a drive motor 50 which drives a pair of spaced drive sprockets, such as a drive sprocket 52, via an output shaft 53 of a speed reducer 54 shown in FIG. 2, a pair of spaced idler sprockets, such as sprocket 56, and a drive chain 58 which links the drive and idler sprockets, and engages the toothed links 34. The modular drive unit 28 includes a handrail drive pulley 60 disposed on each side of the conveyor 12. Each pulley 60 drives a handrail drive unit 62.

A brake 64, which may be on an input shaft 66 of the speed reducer 54, is controlled by a brake controller 68 which is constructed according to the teachings of the invention. Brake controller 68 includes a deceleration servo loop to regulate deceleration of the escalator directly, when a controlled stop is to be made. The actual deceleration of the escalator 10 may be derived from an angular accelerometer, a tachogenerator, or a pulse wheel tachometer. For purposes of example, a pulse wheel tachometer is illustrated, which includes a pulse wheel 70 and a pickup 72. Pulse wheel 70 is mounted for rotation by the drive unit 28, such as via the input shaft 66.

The drive units 28, 30 and 32 are similar in all respects, except brake controller 68 is referred to as a master brake controller, and brake controllers 68' and 68'' are referred to as slave brake controllers. This is because the master brake controller 68 provides a deceleration reference signal $D_R$ for itself, and also for the slave brake controllers 68' and 68''. Otherwise, the brake controllers 68, 68' and 68'' are entirely independent, each having their own dedicated servo loops fed by a local signal responsive to the deceleration of the conveyor 12 at the exact location of the associated drive unit.

Figure 3:
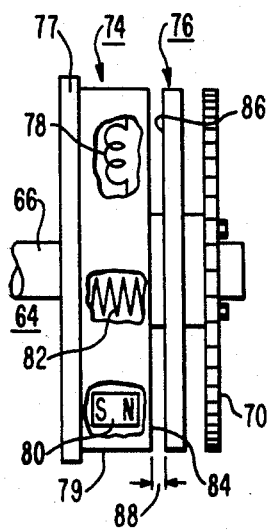
FIG. 3 is a side elevational view of a brake which may be used in the drive units of the apparatus shown in FIGS. 1 and 2, illustrating the brake in its lifted or "picked" configuration.
Figure 4:
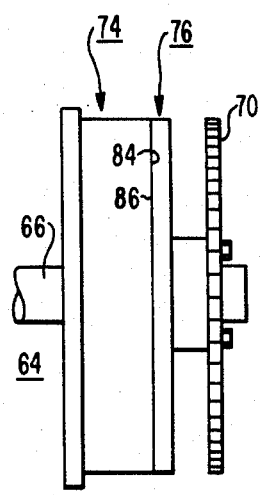
FIG. 4 illustrates the brake shown in FIG. 3 in its set or applied configuration.

FIGS. 3 and 4 are side elevational views of a brake which may be used for the brake 64 shown in FIGS. 1 and 2. In general, brake 64 is set or applied in the absence of brake coil current, and it is picked up when the brake coil current exceeds a predetermined magnitude and less than a higher predetermined magnitude. As used herein, "running" brake current means the brake current when the brake is lifted, and the transportation apparatus is running. "Stopping" brake current is the brake current during a controlled stop of the escalator, which occurs when the driving power is disconnected from the apparatus. Brake 64 shown in FIGS. 3 and 4 includes two basic parts, a brake magnet assembly 74, which is stationary, and an armature 76 which is attached to the shaft to be controlled, e.g., the input shaft 66 of the speed reducer 54. The brake magnet assembly 74 includes a mounting plate 77 and a housing 79. Housing 79 includes an electromagnetic brake coil 78, a plurality of permanent magnets 80, a plurality of compression springs 82, and a high friction surface 84. Armature 76 is essentially a plate member having a flat surface 86 which contacts surface 84 to provide a frictional engagement which develops braking torque in shaft 66. FIG. 3 illustrates brake 64 in its fully lifted or picked configuration, having a brake gap 88 between surfaces 84 and 86. FIG. 4 illustrates brake 64 in its applied or set configuration, with the gap 88 being reduced to zero.

Pulse wheel 70 may be attached to the extreme end of shaft 66.

FIG. 5 is a graph which plots braking torque and the dimension of brake gap 88 on the ordinate versus brake coil current $I_{BR}$ on the abscissa. It will be noted that with zero brake current, the brake gap 88 is zero, and the braking torque is a maximum. Increasing the current in the brake coil 78 produces a magnetic field which is opposite to the magnetic field provided by the permanent magnets 80. Thus, the net flux is reduced, as is the attractive force. The braking torque is reduced along curve portions 300 and 301. The brake gap is zero along curve portions 400 and 401. Increasing the brake current still further eventually causes the force produced by the net flux to balance the internal biasing springs 82. When the spring force exceeds the force caused by the net flux, the armature 76 begins to move away from the stationary magnet assembly 74. This increases the reluctance of the magnetic path, further reducing the net flux force. This is an unstable condition which results in a quick move from zero brake gap at point 402 to full brake gap at point 402′, and a drop in brake torque to zero at point 302. Further increases in brake coil current results in a change in a direction of the flux, but it increases the absolute value which determines net flux force. The torque remains at zero along curve portions 303 and 304, while the brake gap remains a maximum along curve portions 403 and 404. If the current is increased sufficiently, the armature 76 is again attracted to the magnet assembly 74. The reluctance decreases, causing the net flux force to increase further. The armature gap 88 thus quickly closes at point 405, along curve portion 406. Braking torque rises at point 305, along curve portion 306 to apply braking torque again at point 314. Further increasing the brake current $I_{BR}$ causes the brake torque to increase along curve portion 307, while the brake gap remains zero along curve portion 407.

Reducing the brake current $I_{BR}$ causes the brake torque to decrease along curve portions 307 and 308, while the brake gap remains zero along curve portions 407 and 408. At point 409 the springs overcome the net flux, the brake gap goes from zero to maximum along curve portion 414, and the brake torque is zero at point 309.

Further reducing the brake current $I_{BR}$ keeps the gap at maximum along curve portions 403 and 410 while the brake torque remains zero along curve portions 303 and 310. At point 411 the magnetic force exceeds the spring force, the brake gap closes to zero at point 413, along curve portion 412, while the brake torque jumps from zero, at point 311, to point 313, following curve portion 312. As the brake current is further reduced, the brake gap remains zero along curve portion 400, while the brake torque increases along curve portion 300.

Normally, the current cannot be increased to the level which will again provide braking torque, as the brake current is limited, indicated by the limit line 90. FIG. 5A is a graph similar to FIG. 5, except modified to illustrate the effect of brake current limiting. As will be hereinafter explained, the present invention modifies this normal operation of the brake to permit brake coil forcing for faster brake response, and to limit the maximum size of the gap 88 for reduced hysteresis, faster response and a more controllable brake.

Figure 6:
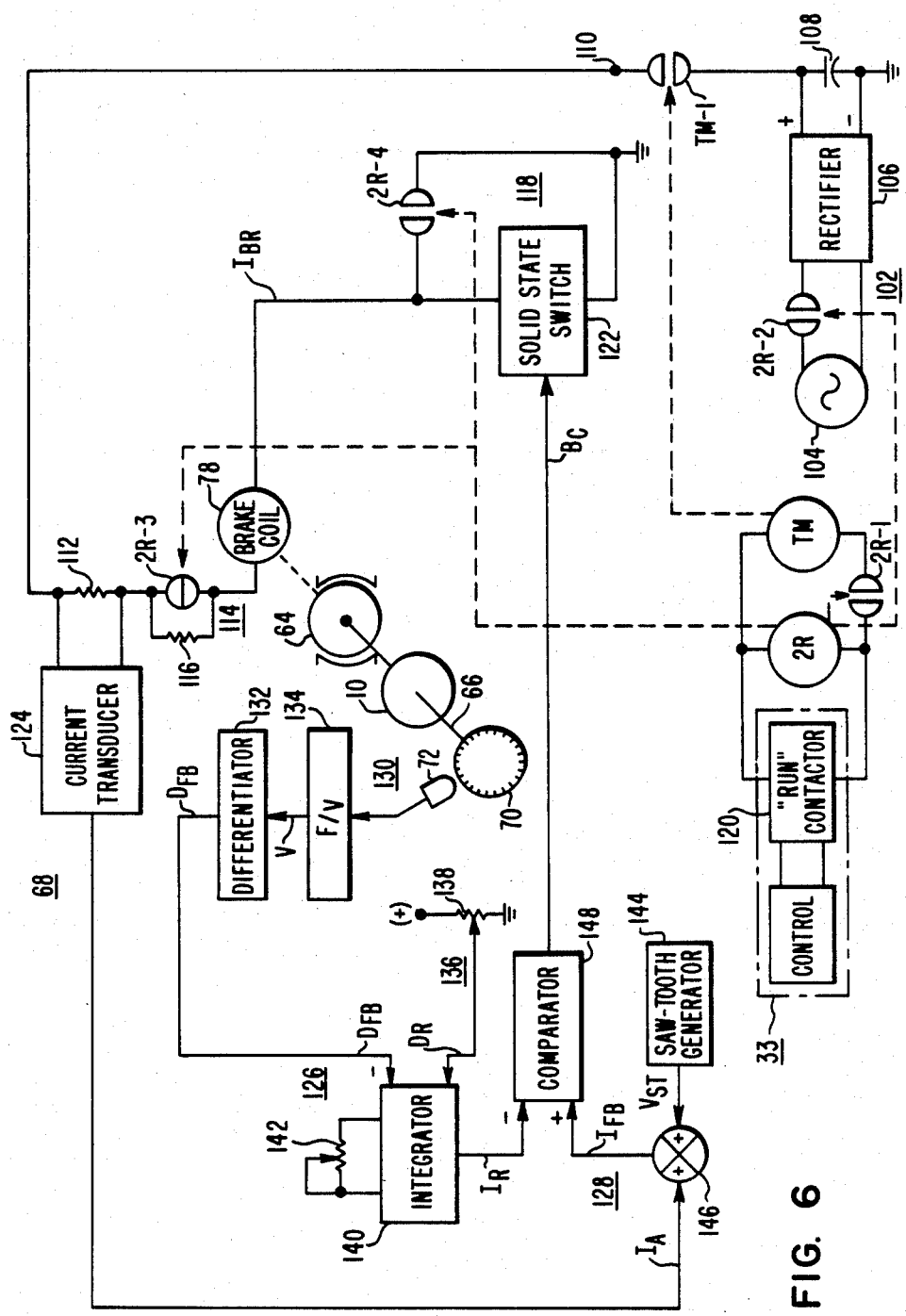
FIG. 6 is a schematic diagram of a brake controller constructed according to a first embodiment of the invention, wherein the running brake current is limited, and the stopping brake current is regulated to stop the transportation apparatus at a predetermined controlled constant deceleration rate.
Figure 7:
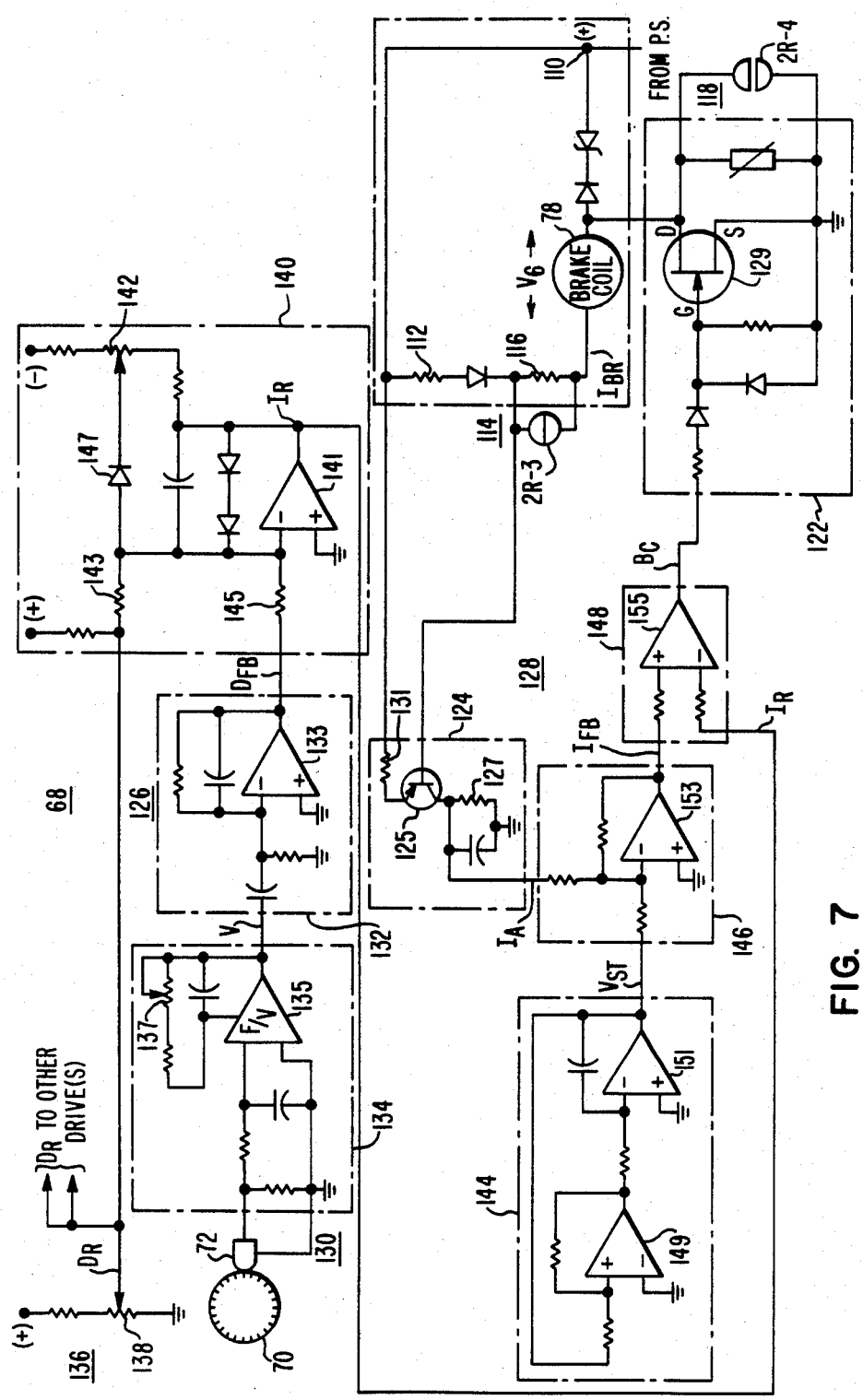
FIG. 7 is a detailed schematic diagram of a specific exemplary implementation of the brake controller shown in FIG. 6.

FIG. 6 is a schematic diagram of a brake controller constructed according to the teachings of the invention, which may be used for the master brake controller 68 shown in FIG. 2. FIG. 7 will also be referred to during the description of FIG. 6, with FIG. 7 being a more detailed schematic diagram which sets forth an exemplary embodiment of the invention. In the embodiment of FIG. 6, the running brake current is limited, but it is not regulated. In another embodiment of the invention, to be hereinafter described, the running brake current is both limited and regulated.

More specifically, a relay 2R is connected to be energized when the escalator run contactor 120, which is part of control 33, is energized. The escalator run contactor 120 is also referenced 120 in the hereinbefore mentioned U.S. Pat. No. 4,276,500, and this patent is hereby incorporated into the present application by reference. Relay 2R includes a N.O. contact 2R-1 which picks up a timing relay TM when relay 2R picks up. When the run contactor 120 drops out to deenergize the electrical drive motor 50 of the drive unit 28, relay TM remains picked up for a short period of time selected to be sufficient to bring the escalator 10 to a controlled stop. Since the deceleration time for an orderly controlled stop will be in the order of 1 to 1½ seconds, relay TM may be set to time out after 2 seconds, for example.

Brake controller 68 includes a DC power supply 102 which includes a source 104 of AC potential, a rectifier 106, a capacitor 108, and an output terminal 110. When relay 2R is energized, a N.O. contact 2R-2 closes to connect supply 104 to rectifier 106, which charges capacitor 108. The output voltage from rectifier 106, which is the same as the voltage across the charged capacitor 108, is connected to output terminal 110 via a contact TM-1 of the timing relay TM. Thus, when the run contactor 120 drops out and relay 2R drops, AC power to rectifier 106 is disconnected. The voltage across capacitor 108, however, still provides sufficient voltage and current for the brake coil 78, for a time sufficient to bring the escalator 10 to a controlled stop. Relay TM then drops, opening its contact TM-1 to positively drop the brake current to zero, if for any reason it is not already at zero.

Figure 8:
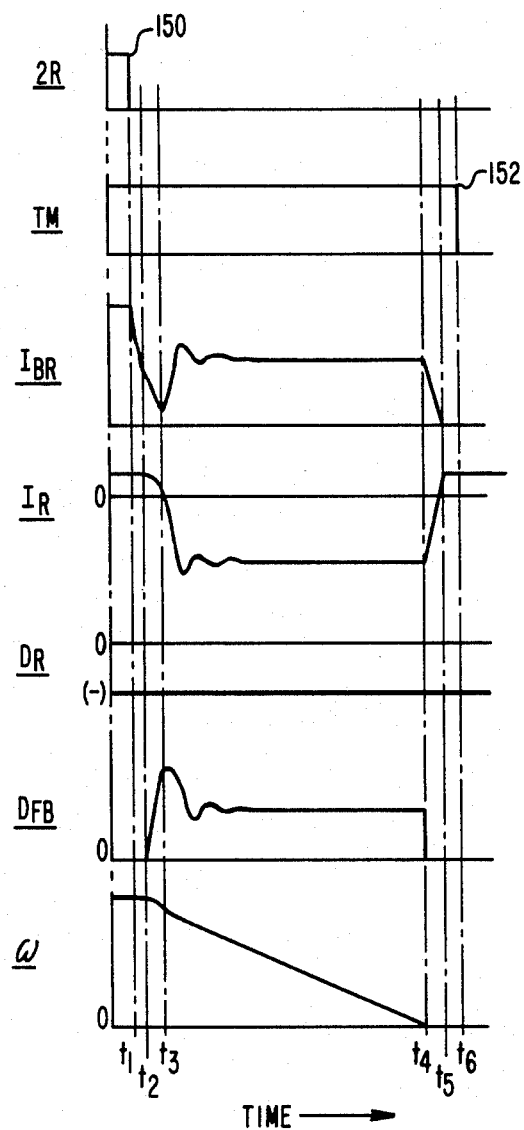
FIG. 8 sets forth timing diagrams useful in understanding the operation of the brake controller shown in FIGS. 6 and 7.

Brake coil 78 is connected between terminal 110 of power supply 102 and ground via a resistor 112, a first parallel circuit 114 which includes a resistor 116 and a N.C. contact 2R-3 of relay 2R, and a second parallel circuit 118 which includes a solid state switch 122 and a N.O. contact 2R-4 of relay 2R. Resistor 112 develops a voltage for a current transducer 124, with transducer 124 providing a signal $I_A$ responsive to the actual brake current $I_{BR}$. Transducer 124 may include a PNP transistor 125 having a resistor 131 in the emitter lead. A current is developed in resistor 131 which develops a voltage drop across itself equal to the voltage across resistor 112. The voltage across a resistor 127, connected from the collector electrode to ground, provides signal $I_A$, which is proportional to $I_{BR}$. The first parallel circuit 114 inserts current limiting resistor 116 into the brake circuit while the escalator is running and the brake 64 is fully picked. This enables the use of a much higher voltage power supply 102, for effective brake coil forcing during the controlled stop. When the escalator 10 starts its controlled stop, i.e., when the run contactor 120 is deenergized, contact 2R-3 closes to remove the current limiting resistor 116 from the brake circuit. This increases the maximum instantaneous brake current available during the controlled stop for quicker response. The actual average brake current $I_{BR}$ during the controlled stop is not as high as when the escalator 10 is running and the brake 64 is fully picked, which will become apparent when the timing diagrams of FIG. 8 are hereinafter explained.

When the escalator 10 is running, contact 2R-4 is closed, bypassing the solid state switch 122. Thus, the brake current $I_{BR}$ is not regulated by the solid state switch 122 while the escalator 10 is running. When the run contactor 120 drops, relay 2R drops and its contact 2R-4 opens to render switch 122 effective during the controlled stop. Solid state switch 122, for example, may include a field effect transistor (FET) 129.

Brake controller 68 includes a deceleration servo loop 126 which provides a current reference signal $I_R$ for an inner current loop 128. The deceleration servo loop 126 develops a signal $D_{FB}$ proportional to the actual deceleration of the escalator at the location of the drive unit 28. This signal may be provided by an angular accelerator, as disclosed in my copending application Ser. No. 387,301, filed June 10, 1982, now U.S. Pat. No. 4,507,607. This signal may also be provided by differentiating a signal proportional to escalator speed. As illustrated, a pulse wheel tachometer 130 provides a voltage V which is differentiated by a differentiator 132, such as an operational amplifier (op amp) 133 connected to provide an output which is the differential of its input. Tachometer 130 includes pulse wheel 70, pickup 72, and a frequency to voltage converter 134. The frequency-to-voltage converter 134 may include an amplifier 135 such as Analog Devices 451J. Pickup 72 develops a signal by detecting the teeth of the pulse wheel 70, with the frequency of this signal being changed to a voltage V having a magnitude proportional to frequency by the frequency-to-voltage converter 134. Adjustable resistor 137 in the feedback circuit of amplifier 135 is adjusted to set all of the tachometers to the same output voltage at full speed of the conveyor, when more than one drive unit is used.

The deceleration servo loop 126 further includes means 136 for providing a reference signal $D_R$ having a magnitude responsive to the desired deceleration rate. Since the desired deceleration rate is a constant, means 136 may include an adjustable resistor 138 and a source of unidirectional potential. Resistor 138 is adjusted to provide the specific deceleration rate required. The deceleration servo loop 126 is completed by an integrating amplifier 140 which provides a brake current reference signal $I_R$ responsive to the difference between the actual deceleration rate $D_{FB}$ and the desired deceleration rate indicated by signal $D_R$. Integrating amplifier 140 may include an op amp 141 connected as an integrating amplifier. Signals $D_R$ and $D_{FB}$ are summed via resistors 143 and 145 respectively, and applied to the inverting input of op amp 141. A diode 147 clamps the reference current $I_R$ to a value selected by an adjustable resistor 142. Thus, the maximum brake current is limited during a controlled stop.

Signal $I_R$ provided by integrator 140 represents the desired brake current, i.e., that brake current $I_{BR}$ which is necessary to decelerate escalator 10 at the desired deceleration rate $D_R$.

The inner current loop 128 utilizes signal $I_4$, which is responsive to the actual brake current $I_{BR}$ via the current transducer 124. Signal $I_4$ is controlled in a pulse width modulated mode by a sawtooth generator 144, according to the teachings of the hereinbefore mentioned copending application Ser. No. 605,041. This copending application is hereby incorporated into the present application by reference. Sawtooth generator 144 may include op amps 149 and 151. Signal $V_{ST}$ provided by sawtooth generator 144 is summed with signal $I_4$ at summing point 146, which may include an op amp 153 connected as a summing amplifier. The summing point 146 provides a signal $I_{FB}$ whose average value is responsive to the actual brake current. Signal $I_{FB}$ is compared with the desired brake current signal $I_R$ in a comparator 148, which may include an op amp 155, such as National Semiconductor's LM-2901N. Comparator 148 provides a brake control signal $B_C$ responsive to the difference between signals $I_R$ and $I_{FB}$, with signal $B_C$ controlling the impedance of the solid state switch 122.

FIG. 8 sets forth timing diagrams illustrating the states of relays 2R and TM, signals $D_{FB}$ and $D_R$ responsive to the actual and desired deceleration rates, respectively, brake current $I_{BR}$, signal $I_R$ responsive to the desired brake current, and the velocity $\omega$ of the escalator 10. The timing diagrams of FIG. 7 start with the escalator 10 already running. Thus, relays 2R and TM are picked up, with the brake current $I_{BR}$ being constant and at its maximum value. The brake current reference signal $I_R$ is slightly greater than zero, the actual deceleration signal $D_{FB}$ is zero, and the escalator speed $\omega$ is at its constant running speed.

When a stop is initiated at time $t_1$, relay 2R drops immediately at 150. Relay TM drops out a short time later, at 152, with this delay being selected to exceed the escalator stopping time. Brake coil current $I_{BR}$ begins to decay and it drops to a level which causes the brake armature 76 to contact the stationary portion 74 of the brake at time $t_2$, developing brake torque at time $t_3$. Because of high brake torque hysteresis, the initial brake torque is high, and the high brake torque starts to decelerate the escalator very rapidly. The desired brake current $I_R$ then changes rapidly to pull the actual brake current $I_{BR}$ to the proper level, which causes the actual deceleration rate $D_{FB}$ to start to closely track the desired deceleration signal $D_R$. It will be noted that the average actual brake current $I_{BR}$ during the period of brake control is substantially constant, and lower than the running brake current, notwithstanding the removal of the brake current limiting resistor 116 from the brake circuit. While the average brake current during stopping is lower than the running brake current, the instantaneous brake current available is larger than the running brake current, which improves the transient response of the brake. The escalator speed $\omega$ decreases linearly, reaching zero speed at time $t_4$. Signal $D_{FB}$ drops to zero, the reference current signal $I_R$ is driven low, and the actual brake current $I_{BR}$ is then rapidly driven to zero at time $t_5$. Timing relay TM drops out at time $t_6$.

If the escalator 10 includes more than one drive unit, the brake controllers of the other drive units would be connected to terminal 110 of power supply 102, and the circuitry of the additional brake controllers would be the same as shown in FIG. 6, except means 136 would not be required in the additional brake controllers. Signal $D_R$ provided by means 136 of the master brake controller 68 would also be applied to the integrators of each of the slave brake controllers 68' and 68".

Figure 9:
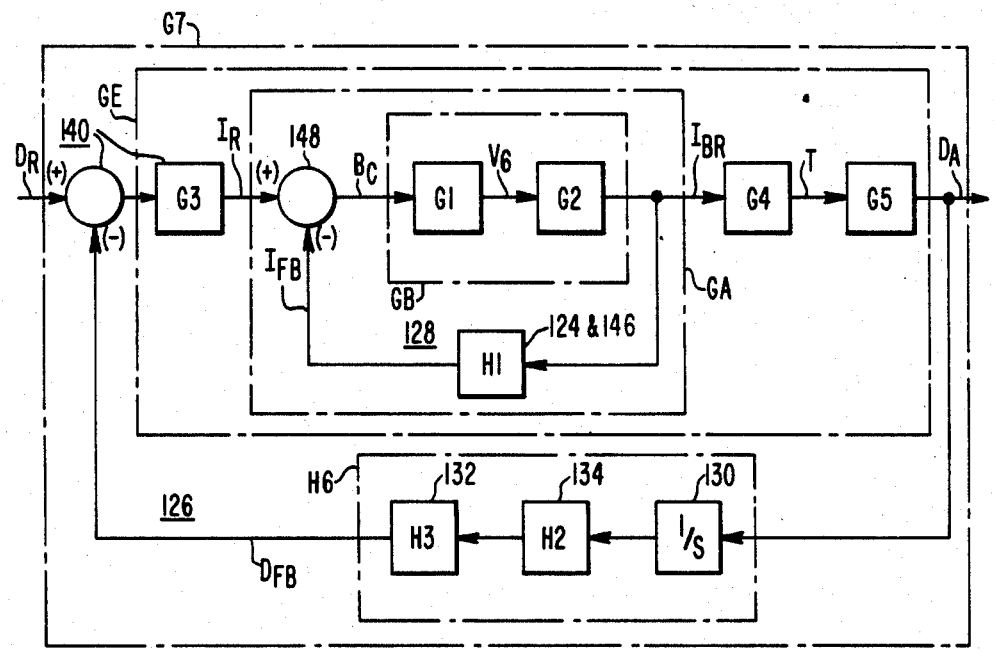
FIG. 9 is a block diagram setting forth the servo loops utilized in the brake controller shown in FIGS. 6 and 7.

FIG. 9 is a control block diagram which illustrates the deceleration servo loop 126, and the inner current loop 128, along with the transfer functions and feedback elements of the servo loops. (See Table I.) Block 1/s indicates integration of acceleration to produce velocity, H2 indicates the pickup 72, pulse wheel 70, and the frequency-to-voltage converter 134, and H3 the differentiator 132. Signals $D_R$ and $D_{FB}$ are summed and the result applied to G3, which represents the transfer function of the integrator 140. G3 provides signal $I_R$ for the current loop 128, with the feedback element H1 representing the current transducer 124 and the mixer 146 which combines the sawtooth signal $V_{ST}$ and the signal $I_A$ to provide signal $I_{FB}$. Signals $I_R$ and $I_{FB}$ are summed in comparator 148 to provide signal $B_C$ for G1, which represents switch 122. Function G1 develops a voltage V6 for brake coil G2. The brake current $I_{BR}$ applied to G4, the transfer function of the brake, provides a torque T which is applied to the system inertia, which has a transfer function G5, resulting in the actual deceleration of the escalator, reference $D_A$. Typical values of the transfer functions and feedback elements are set forth in Table I.

TABLE I

| FUNCTION | VALUE |
|---|---|
| G1 | 160 |
| G2 | $\dfrac{2.3 * 10^{-3}}{1 + s/43}$ |
| G3 | 77/s |
| G4 | 500 |
| G5 | 4.6 |
| GB | G1 * G2 |
| GA | $\dfrac{GB}{1 + GB * H1}$ or $I_{BR}/I_R$ |
| H1 | $\dfrac{32}{1 + S/103}$ |
| H2 | 0.106 |
| H3 | $\dfrac{0.186S}{(1 + S/323)(1 + s/223)}$ |
| GE | G3 * GA * G4 * G5 |
| H6 | H3 * H2 * 1/s |
| G7 | $\dfrac{GE}{1 + GE * H6}$ or $D_A/D_R$ |

Figure 12:
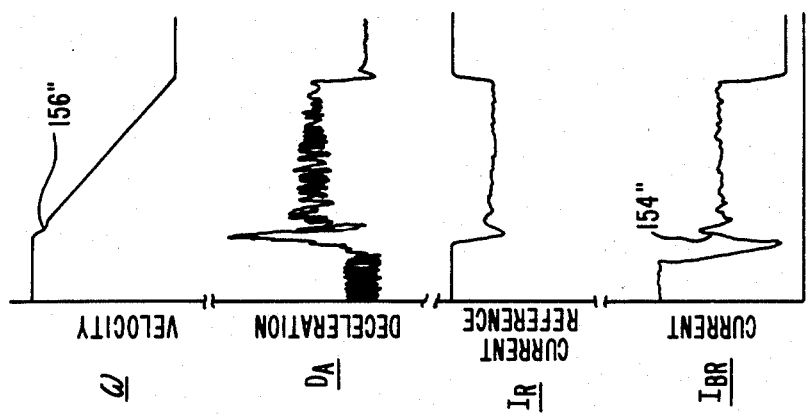
FIGS. 10, 11 and 12 are strip chart waveforms which illustrate the improvement in the response of the brake when controlled with the brake controller of FIGS. 6 and 7, when higher voltage power supplies are utilized.
Figure 11:
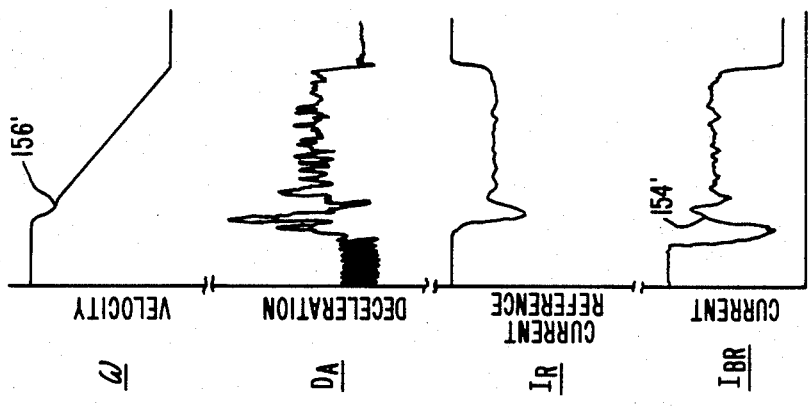
Figure 10:
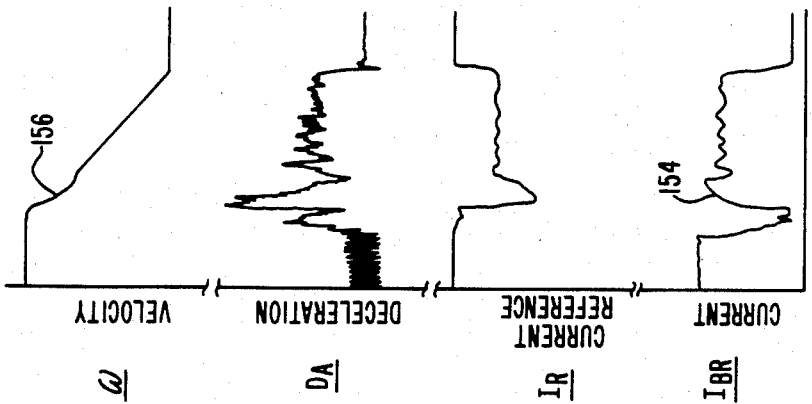

FIGS. 10, 11 and 12 are graphs which illustrate the improvement in brake performance which results in increasing the brake coil supply voltage available at 110. Raising the brake supply voltage is made possible by the current limiting resistor 116 and relay contact 2R-3. FIG. 10 illustrates the current reference signal $I_R$, the actual brake current $I_{BR}$, the actual deceleration rate $D_A$ of escalator 10, and the escalator velocity $\omega$, when operating with a 90 volt DC power supply. FIGS. 11 and 12 are similar to FIG. 10, except with the power supply voltage being 115 volts DC and 125 DC, respectively. It will be noted that the actual brake current $I_{BR}$ has in increasingly faster rise along slope 154, when the supply voltage is increased, indicating a substantial improvement in brake response time. It will also be noted that the drop in escalator velocity at the start of deceleration, indicated at 156 also becomes less and less with increasing power supply voltage. A further improvement in both areas was achieved by removing one 6.6 msec filter from the tachometer circuit, and this was achieved without offsetting disadvantages due to the increased ripple in the deceleration feedback signal.

To apply braking torque, the brake current must be reduced to a value lower than the value which allowed the brake gap to develop. The larger the brake gap, the lower the current must be reduced. At some point, when the net flux force is greater than the biasing spring force, the armature snaps in and closes the gap to zero. At that point, the braking torque may be greater than required. The larger the gap, the greater the hysteresis and the slower the ability to switch between gap, no-gap states, due to the time constant, the acceleration rates to which the armature is subjected, and the brake gap distance to be traveled. A large brake gap causes a larger swing in coil current, a lower armature accelerating force, and a greater distance to travel, than a smaller brake gap. Consequently, a smaller brake gap allows a faster, more controllable brake.

Figure 13:
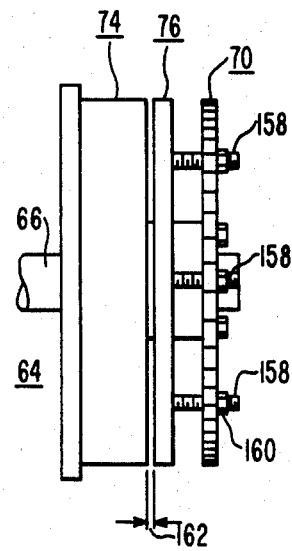
FIG. 13 illustrates the brake shown in FIG. 3, except modified according to the teachings of the invention to mechanically limit the brake gap, as well as to make it more uniform.
Figure 14:
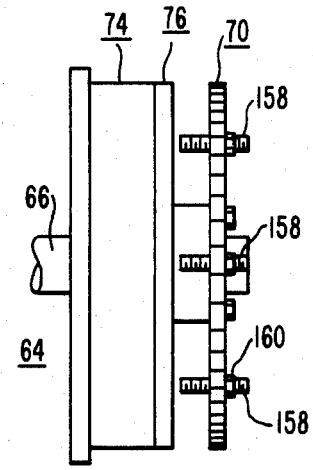
FIG. 14 illustrates the modified brake of FIG. 13, except in its "set" configuration.

In FIG. 3, the brake 64 is shown picked up, with a relatively large brake gap, and FIG. 4 shows the brake 64 with the brake in its applied configuration. Setting brake gap 88 with a commercial brake is difficult, and the brake gap is far from uniform. An improvement in the brake 64, according to the teachings of the invention, is shown in FIGS. 13 and 14. Advantage is taken of the steel pulse wheel 70 which is fastened to the same hub as the movable armature 76. A plurality of adjusting screws 158 are added to the pulse wheel 70 by drilling and tapping the pulse wheel to receive the screws. The brake coil 78 is then energized to release the armature 76 to its full, large gap 88 shown in FIG. 3. Non-magnetic shims of the desired thickness are slipped into the gap 88. The coil current is then reduced to zero, causing the armature 76 to be attracted to the magnet assembly 74. This captures the non-magnetic shims and sets the desired brake gap 162 shown in FIG. 13. Lock nuts 160 disposed on screws 158 are loosened and the motion limit adjusting screws 158 are turned in finger tight. The lock nuts 160 are then tightened. Brake coil 78 is again energized, allowing the removal of the non-magnetic shims. This establishes the desired gap to that shown at 162 in FIG. 13. A further gain in brake performance is realized because of the fact that the brake gap 162 is much more uniform than the brake gap of an unmodified commercially available brake.

Figure 16:
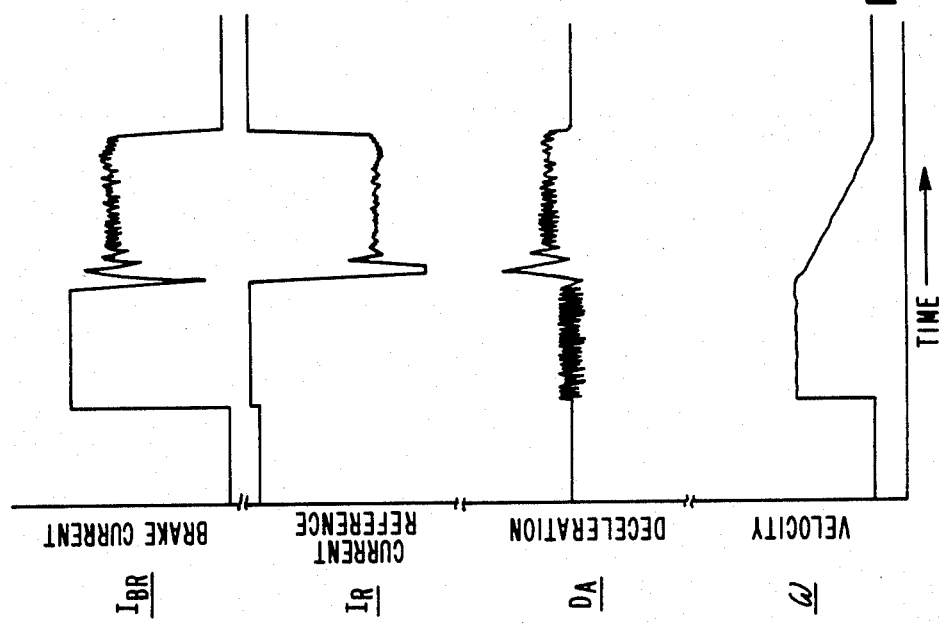
FIGS. 15 and 16 are strip chart waveforms which illustrate the improvement in the response of the brake, when mechanical limiting of the brake gap dimension is utilized.
Figure 15:
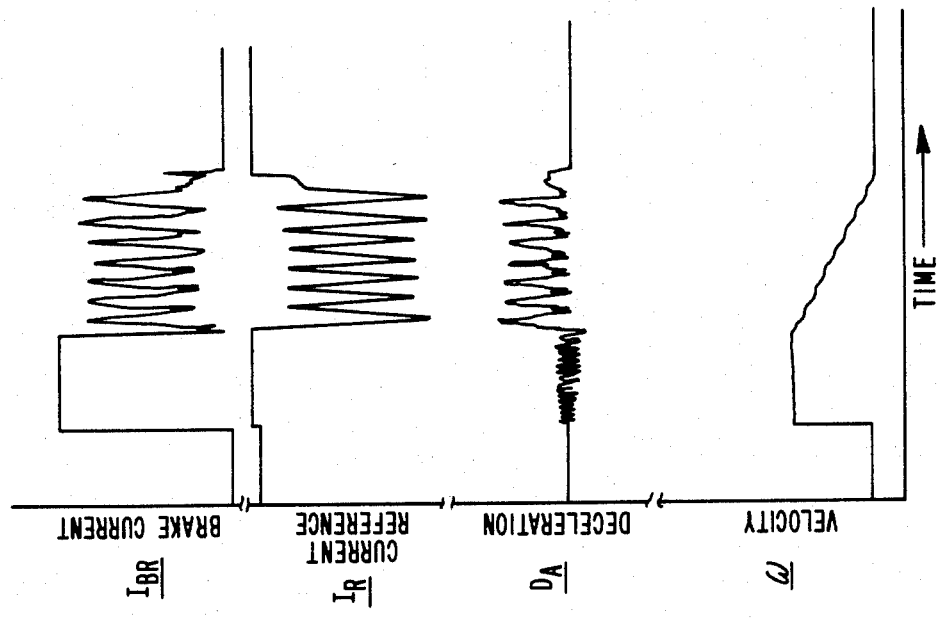

FIGS. 15 and 16 are graphs which illustrate the dramatic improvement in brake performance by simply reducing and making uniform the gap 162, as described relative to FIGS. 13 and 14. FIG. 15 illustrates the brake current $I_{BR}$, the current reference $I_R$, the actual deceleration rate $D_A$ and the escalator velocity $\omega$ without mechanically limiting the brake gap. FIG. 16 illustrates the same parameters with mechanical limiting of the armature brake gap. It will be noted that without limiting the brake gap, the brake operates bi-stably, i.e., gap, no-gap, because of the level of torque required and the servo transient performance. After the mechanical limit was applied, as shown in FIGS. 13 and 14, the actual deceleration rate remained very steady after the first impact of the armature 76 against the magnet assembly 74.

Figure 17:
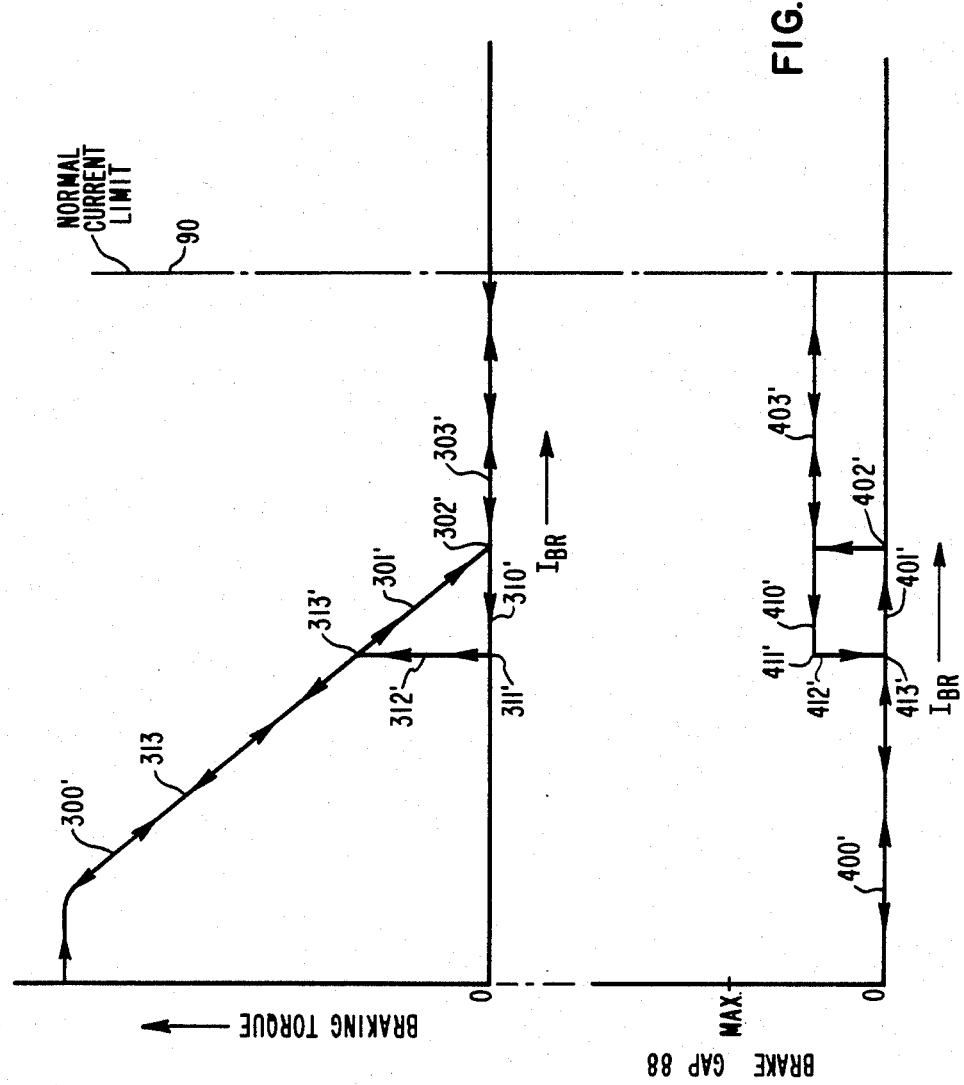
FIG. 17 is a graph similar to the graph of FIG. 5, illustrating the improvements achieved by mechanically limiting the brake gap as shown in FIGS. 13 and 14.

FIG. 17 is a graph which is similar to the graph of FIG. 5A, except illustrating the improvements resulting in the control of braking torque by mechanically reducing the maximum brake gap. The controlled braking indicated by curve 300' is extended substantially. In returning from the normal current limit 90, the torque remains at zero along curve portions 303' and 310'. The brake gap, which is mechanically limited to be less than maximum, follows curve portions 403' and 410'. At point 411' the brake gap jumps to zero (point 413') along curve portion 412', while the brake torque jumps to point 313' along curve portion 312'. It will be noted that the suddenly applied brake torque at point 313' is substantially less than the value at point 313 in FIG. 5A. Required values of torque in the region between points 313 and 313' are achieved at zero gap in FIG. 17, while in FIG. 5A it was required to jump to a high value at point 313 and come down along curve portion 301. The large hystersis of FIG. 5A can easily result in limit cycle oscillation, as seen in FIG. 15, where relatively low values of decelerating torque are required.

Figure 17A:
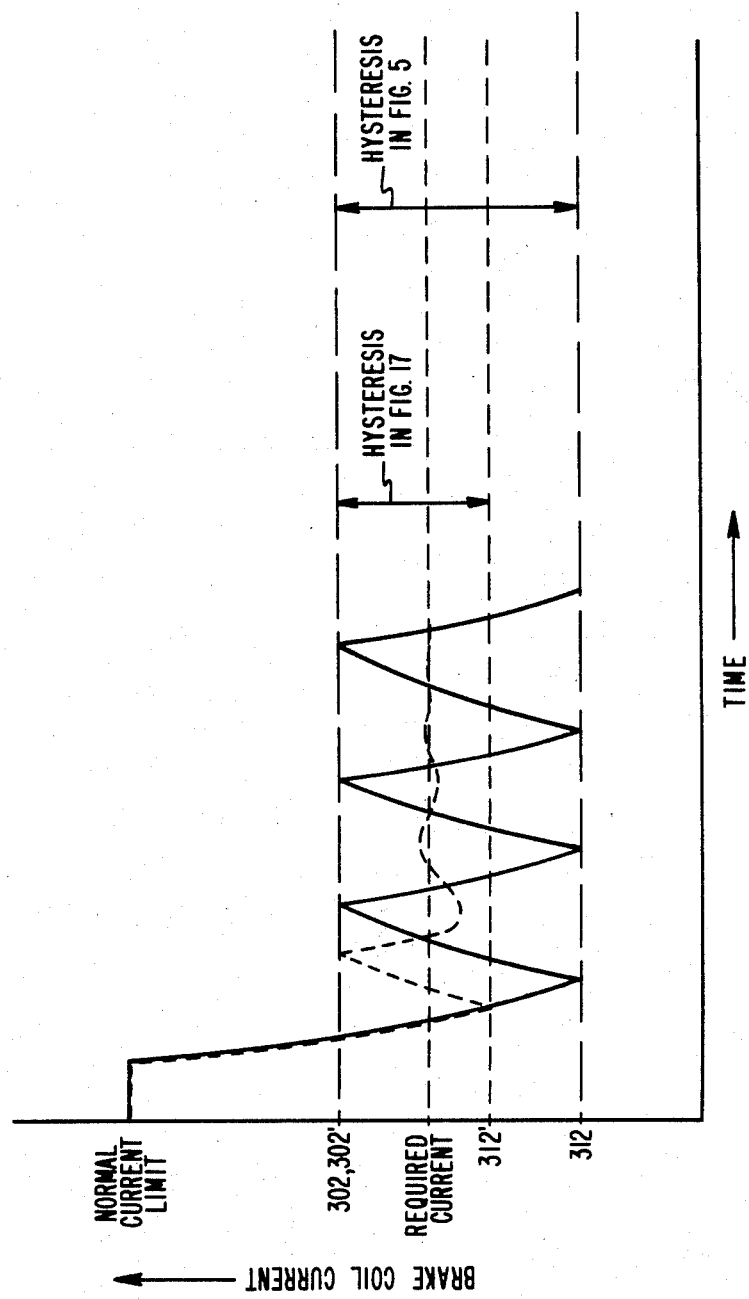
FIG. 17A compares brake coil current versus time for an unmodified brake, and for a brake whose gap has been mechanically limited.

FIG. 17A is a graph which shows brake current versus time, with the solid curve being for a brake whose gap has not been limited, and with the broken curve being for a brake whose gap has been mechanically limited according to the teachings of the invention. The difference in hysteresis, and improved performance of the brake while decelerating escalator 10 is readily apparent.

FIGS. 18A through 18G show actual strip chart data taken on a two-drive escalator, over the range of 0 to 12,000 pounds load. The lower trace in each Figure illustrates the velocity of the escalator at the upper drive unit, while the upper trace illustrates the velocity of the escalator at the lower drive unit. It will be noticed that just before controlled deceleration takes place, there is generally a significant difference in the velocity profiles of the upper and lower drives, indicating, that even though the escalator rack or conveyor 12 is constructed of rigid, pivotally interconnected toothed links, a looseness exists between the drives which is sufficient to cause a time delay between the drives. This may be the reason for failure of prior art attempts to control more than one brake unit with one velocity based servo.

Figure 19:
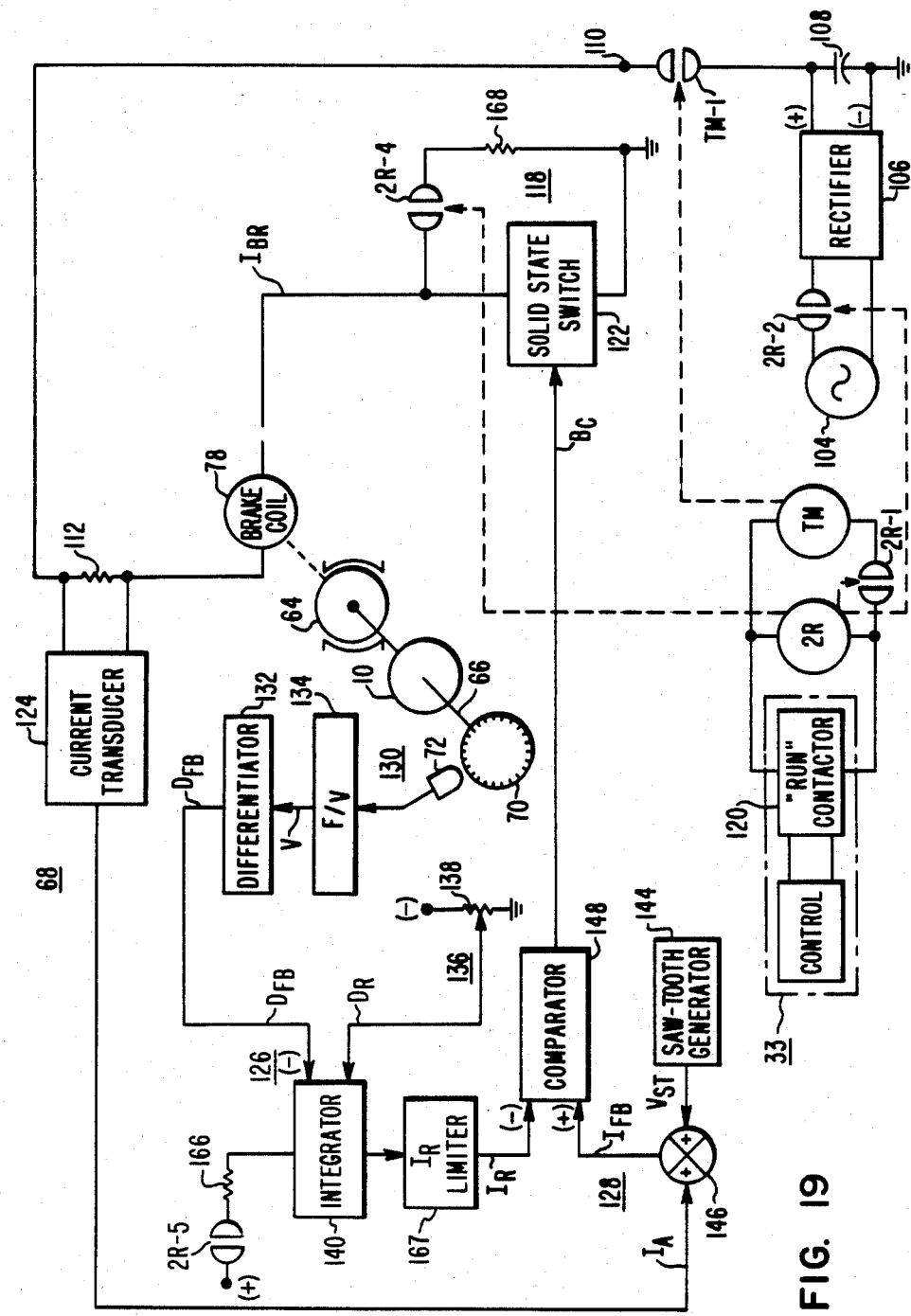
FIG. 19 is a schematic diagram, similar to that of FIG. 6, except setting forth an embodiment of the invention in which, in addition to controlling the stopping brake current, the running brake current is also regulated.

It has been found that the release of some brakes from their picked up configuration while the escalator is running, at the start of a controlled stop of the escalator, is sensitive to brake temperature, brake supply voltage, and the specific characteristics of the brake itself. This condition is remedied, according to the teachings of the invention, by adding the brake running current to the servo loop. FIG. 19 is similar to FIG. 6, except modified to include this aspect of applicant's invention.

Figure 20:
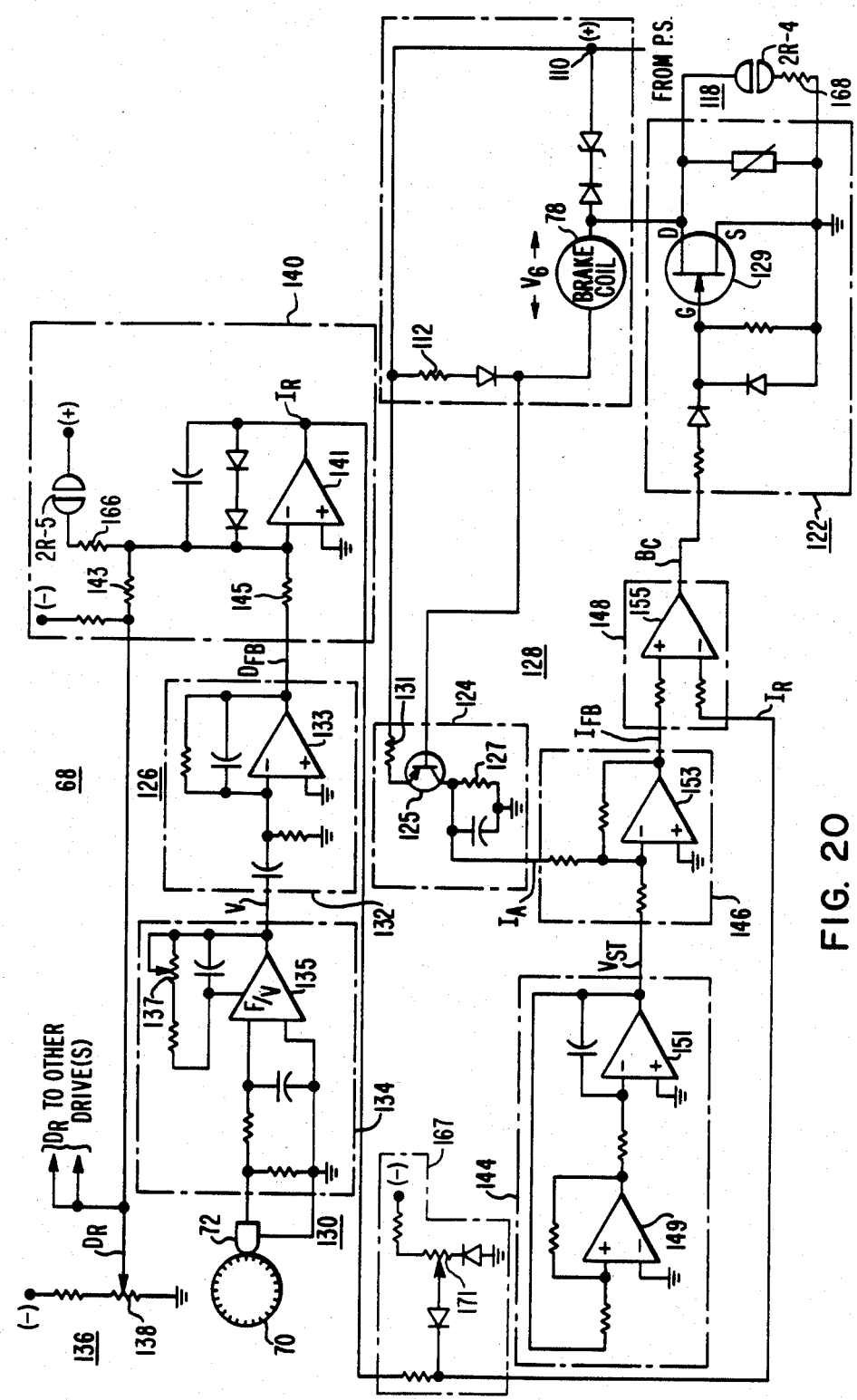
FIG. 20 is a schematic diagram, similar to FIG. 7, except setting forth a detailed exemplary embodiment of the aspect of the invention set forth in FIG. 19.

More specifically, a N.O. contact 2R-5 of relay 2R is added to the integrator 140, along with a resistor 166, to drive integrator 140 into saturation. A current limiter 167 is added to select the magnitude of the reference current signal $I_R$ to be used while the escalator is running, and to function as a current limit while decelerating. In other words, signal $I_R$ determines the magnitude of the running brake current, and it limits the brake current during deceleration. Adjustable resistor 171, in this embodiment, adjusts the value. The parallel circuit 114 of the FIG. 6 embodiment is eliminated. A resistor 168 is added to the parallel circuit 118, in series with relay contact 2R-4. Resistor 168 is selected to provide a predetermined current flow, such as a resistor having a value of 800 ohms, to reduce the voltage the solid state switch 122 sees while regulating the running brake current. FIG. 20 is similar to FIG. 7, except modified to include the changes introduced by the FIG. 19 embodiment of the invention.

In summary, there has been disclosed new and improved transportation apparatus, such as an escalator or a moving walk, having one or more drive units. Each drive unit includes its own deceleration based servo loop, with an inner current loop, for regulating the brake coil current, at least while stopping the transportation apparatus with a predetermined controlled deceleration rate. The running brake current, i.e., the brake current which maintains the brake in its lifted configuration while the transportation apparatus is in its normal running mode, is also added to the servo loop in another embodiment of the invention.

Faster transient response of the brake, and better and smoother control of the brake, is achieved by: (a) limiting the running brake current, enabling a higher power supply to be used for brake coil forcing during the slow down and stopping phase of the transportation apparatus, and (b) by mechanically limiting the brake gap, to eliminate the bi-stable operating mode and cause the brake to provide a substantially linear braking torque characteristic response to brake coil current, over the deceleration phase of the transportation apparatus. When the transportation apparatus has multiple drive units, each drive unit has its own independent deceleration based servo, with its own deceleration feedback signal taken from the specific location of the associated drive unit. A single deceleration reference signal is generated, which is applied to the servos of all of the drive units.

I claim as my invention:

1. Transportation apparatus, comprising:
   a conveyor,
   and at least one drive for said conveyor,
   said at least one drive including:
   (a) an electric motor for driving said conveyor, and
   (b) an electrically controlled brake, including a brake coil and a brake controller for decelerating said conveyor when the electric motor ceases to drive said conveyor,
   said brake controller including a deceleration servo loop and an inner current loop,
   said deceleration servo loop including means providing a first signal having a constant magnitude representing the desired deceleration rate of the conveyor, and means responsive to movement of said conveyor for providing a second signal responsive to the actual deceleration rate of the conveyor,
   said deceleration servo loop providing a current reference signal for said current loop responsive to said first and second signals,
   said current loop controlling the current in said brake coil.

2. The transportation apparatus of claim 1 including means for regulating the brake current while the electric motor is driving the conveyor.

3. The transportation apparatus of claim 1 including at least one additional drive for the conveyor, spaced from the at least one drive, with each drive having an independent deceleration servo loop, including separate means for providing its own local deceleration feedback signal, and including means for providing a single deceleration reference signal which is common to all drives.

4. Transportation apparatus, comprising:
   a conveyor,
   and at least one drive for said conveyor,
   said at least one drive including:
   (a) an electric motor for driving said conveyor, and
   (b) an electrically controlled brake, including a brake coil and a brake controller for decelerating said conveyor when the electric motor ceases to drive said conveyor,
   said brake controller including a deceleration servo loop and an inner current loop,
   said deceleration servo loop providing a current reference signal for said current loop, said brake controller including a power supply for the brake coil, said current loop including means for limiting the brake coil current, which means is effective only while the electric motor is driving the conveyor, to enable the use of a higher voltage power supply for said brake coil for increased brake coil forcing during brake controlled deceleration of the conveyor.

5. Transportation apparatus, comprising:
a conveyor,
and at least one drive for said conveyor,
said at least one drive including:
(a) an electric motor for driving said conveyor, and
(b) an electrically controlled brake, including a brake coil and a brake controller for decelerating said conveyor when the electric motor ceases to drive said conveyor,
said brake controller including a deceleration servo loop and an inner current loop,
said deceleration servo loop providing a current reference signal for said current loop,
said electrically controlled brake including rotatable and non-rotatable braking members, separable to provide a predetermined maximum brake gap therebetween when the brake coil is fully energized,
said brake controller including a power supply for the brake coil,
said current loop including means for limiting the brake current which is effective only while the electric motor is driving the conveyor, to enable use of a higher voltage power supply for said brake coil for increased brake coil forcing during brake controlled deceleration of the conveyor, as well as to increase the brake response speed at the start of deceleration by reducing brake gap state change.

6. The transportation apparatus of claim 5 including means mechanically reducing the maximum gap which is effective while the electrical motor is driving the conveyor, as well as during brake controlled deceleration of the conveyor, to increase brake response speed and reduce hysteresis.

7. Transportation apparatus, comprising:
a conveyor,
and at least one drive for said conveyor,
said at least one drive including:
(a) an electric motor for driving said conveyor, and
(b) an electrically controlled brake, including a brake coil and a brake controller for decelerating said conveyor when the electric motor ceases to drive said conveyor,
said brake controller including a deceleration servo loop and an inner current loop,
said deceleration servo loop providing a current reference signal for said current loop,
said electrically controlled brake including rotatable and non-rotatable braking members separable to provide a predetermined maximum brake gap therebetween when the brake coil is fully energized, and means mechanically reducing the maximum brake gap, which is effective while the electric motor is driving the conveyor, as well as during brake controlled deceleration of the conveyor, to increase brake response speed and reduce hysteresis.

8. Transportation apparatus, comprising:
a conveyor,
and at least one drive for said conveyor,
said at least one drive including:
(a) an electric motor for driving said conveyor, and
(b) an electrically controlled brake, including a brake coil and a brake controller for decelerating said conveyor when the electric motor ceases to drive said conveyor,
said brake controller including a deceleration servo loop and an inner current loop,
said deceleration servo loop providing a current reference signal for said current loop,
said deceleration servo loop including:
(a) first means providing a first signal representative of the desired deceleration rate of the conveyor,
(b) second means providing a second signal responsive to the actual deceleration rate of said conveyor at the location of said at least one drive, and
(c) third means providing a third signal responsive to a comparison of said first and second signals, with said third signal being the current reference signal for the current loop,
said current loop including:
(d) fourth means providing a fourth signal responsive to the actual brake current,
(e) fifth means providing a fifth signal responsive to a comparison of said third and fourth signals, and
(f) sixth means controlling the brake current in response to said fifth signal, at least when the electric motor ceases to drive the conveyor.

9. The transportation apparatus of claim 8 wherein the first signal provided by said first means is a selectable constant.

10. The transportation apparatus of claim 8 wherein the sixth means additionally includes means for controlling the brake current while the electric motor is driving the conveyor.

11. The transportation apparatus of claim 8 wherein the fourth means includes means for pulse width modulating the fourth signal.

12. The transportation apparatus of claim 8 including seventh means, effective only when the electric motor is driving the conveyor, for limiting the current through the brake coil.

13. The transportation apparatus of claim 8 including at least one additional drive for the conveyor, spaced from the at least one drive, which, similar to the at least one drive, includes an independent deceleration servo loop, and means providing a separate signal responsive to the actual deceleration rate of the conveyor at the location of the at least one additional drive, and wherein the first signal provided by the first means of the at least one drive is also applied to the deceleration servo loop of the at least one additional drive, such that the first signal is common to all drives.

* * * * *